(12) United States Patent
Dal Bianco et al.

(10) Patent No.: US 12,051,963 B2
(45) Date of Patent: Jul. 30, 2024

(54) MINIMUM PEAK CURRENT FOR POWER CONVERTER

(71) Applicant: Infineon Technologies AG, Neubiberg (DE)

(72) Inventors: Davide Dal Bianco, Schio (IT); Tommaso Pieretti, Padua (IT); Peter Lang, Graz (AT); Stefano Orlandi, San Bonifacio (IT); Florian Regvar, Graz (AT)

(73) Assignee: Infineon Technologies AG, Neubiberg (DE)

( * ) Notice: Subject to any disclaimer, the term of this patent is extended or adjusted under 35 U.S.C. 154(b) by 180 days.

(21) Appl. No.: 17/653,693

(22) Filed: Mar. 7, 2022

(65) Prior Publication Data

US 2023/0283184 A1 Sep. 7, 2023

(51) Int. Cl.
*H02M 3/158* (2006.01)
*H02M 1/00* (2006.01)

(52) U.S. Cl.
CPC .......... *H02M 1/0003* (2021.05); *H02M 3/158* (2013.01)

(58) Field of Classification Search
CPC ............................................ H02M 3/155–1588
See application file for complete search history.

(56) References Cited

U.S. PATENT DOCUMENTS

| | | | | |
|---|---|---|---|---|
| 2001/0036085 | A1* | 11/2001 | Narita | H02M 3/1588 363/16 |
| 2014/0062449 | A1* | 3/2014 | Qu | G05F 3/02 323/311 |
| 2019/0181859 | A1* | 6/2019 | Wibben | H03K 17/6871 |
| 2019/0252968 | A1* | 8/2019 | Li | H02M 3/156 |

* cited by examiner

*Primary Examiner* — Peter M Novak
(74) *Attorney, Agent, or Firm* — Shumaker & Sieffert, P.A.

(57) ABSTRACT

A circuit for controlling a switch of a power converter. The circuit includes loop control circuitry configured to generate a control signal based on a feedback signal for the power converter and undervoltage circuitry. The undervoltage circuitry is configured to compare a voltage for a capacitor of the power converter with a voltage threshold. The undervoltage circuitry is further configured to, in response to the voltage for the capacitor of the power converter being greater than the voltage threshold, generate a switching signal to drive a switch of the power converter based on the control signal. The undervoltage circuitry is further configured to, in response to the voltage for the capacitor of the power converter being less than the voltage threshold, generate the switching signal to drive the switch of the power converter to the switched-in state until an inductor current is greater than an electrical current threshold.

20 Claims, 5 Drawing Sheets

MINIMUM PEAK CURRENT FOR POWER CONVERTER

TECHNICAL FIELD

This disclosure relates to circuits and techniques for generating a switching signal, and more specifically, circuits and techniques for generating a switching signal associated with operating a power converter.

BACKGROUND

A driver circuit may generate a switching signal to control an operation of a power converter. The driver circuit may control a voltage, current, and/or power output by the power converter using a duty cycle of the switching signal. For example, the driver circuit may generate the switching signal with a duty cycle to regulate a voltage output by a Buck converter.

SUMMARY

In general, this disclosure is directed to techniques for operating a power converter to help to ensure that a bootstrap capacitor of the power converter remains charged. For example, in response to a voltage for a capacitor (e.g., a bootstrap capacitor) of the power converter being less than a voltage threshold, undervoltage circuitry may be configured to generate a switching signal to drive a switch of the power converter to a switched-in state (e.g., activated) until an inductor current for an inductor of the power converter is greater than an electrical current threshold. In this way, the techniques described herein for controlling the inductor current may extend the input voltage range and minimum load current range where the power converter can operate, which may help to improve the performance of the power converter.

In one example, this disclosure describes a circuit for controlling a switch of a power converter. The circuit includes loop control circuitry configured to generate a control signal based on a feedback signal for the power converter and undervoltage circuitry. The undervoltage circuitry is configured to compare a voltage for a capacitor of the power converter with a voltage threshold. The undervoltage circuitry is further configured to, in response to the voltage for the capacitor of the power converter being greater than the voltage threshold, generate a switching signal to drive a switch of the power converter based on the control signal. The undervoltage circuitry is further configured to, in response to the voltage for the capacitor of the power converter being less than the voltage threshold, generate the switching signal to drive the switch of the power converter to the switched-in state until an inductor current for an inductor of the power converter is greater than an electrical current threshold.

In another example, this disclosure describes a method for controlling a switch of a power converter. The method includes generating a control signal based on a feedback signal for the power converter and comparing a voltage for a capacitor of the power converter with a voltage threshold. The method further includes, in response to the voltage for the capacitor of the power converter being greater than the voltage threshold, generating a switching signal to drive a switch of the power converter based on the control signal and in response to the voltage for the capacitor of the power converter being less than the voltage threshold, generating the switching signal to drive the switch of the power converter to the switched-in state until an inductor current for an inductor of the power converter is greater than an electrical current threshold.

In one example, this disclosure describes a system including a power converter and a control circuit. The control circuit including loop control circuitry configured to generate a control signal based on a feedback signal for the power converter and undervoltage circuitry. The undervoltage circuitry is configured to compare a voltage for a capacitor of the power converter with a voltage threshold, when the voltage for the capacitor of the power converter is greater than the voltage threshold, generate a switching signal to drive a switch of the power converter based on the control signal, and when the voltage for the capacitor of the power converter is less than the voltage threshold, generate the switching signal to drive the switch of the power converter to the switched-in state until an inductor current for an inductor of the power converter is greater than an electrical current threshold.

Details of these and other examples are set forth in the accompanying drawings and the description below. Other features, objects, and advantages will be apparent from the description and drawings, and from the claims.

DETAILED DESCRIPTION

In general, this disclosure is directed to techniques for operating a power converter. For example, a driver circuit may control a power converter, such as a Buck converter, using a bootstrap capacitor. For example, the bootstrap capacitor may be used to generate a voltage for driving a high-side switch of the Buck converter. For instance, a control circuit may operate (e.g., switch-in or switch-out) a high-side switch of the Buck converter using a voltage stored at the bootstrap capacitor. In this way, a control circuit may omit a high voltage source for generating the voltage for driving the high-side switch, which may reduce a complexity of the control circuit compared to systems using both a low voltage source for generating a voltage for driving a low-side switch of a power converter and high voltage source for generating a voltage for driving a high-side switch of the power converter. While the above example is directed to a Buck converter, techniques described herein may be applied to other power converters and other circuits.

Both synchronous converters (e.g., a Buck converter with a low-side switch) and non-synchronous DC-DC converters (e.g., a Buck converter with a diode instead of a low-side switch) may suffer from several drawbacks when operating with a bootstrap capacitor. A Buck converter is again used as example, but the same considerations can apply to other topologies using bootstrap cap to supply floating domains.

In several applications the power converter may operate with an input voltage (e.g., a supply voltage) close to a minimum voltage needed to supply the floating domain (e.g., a voltage across the bootstrap capacitor). In a non-synchronous DC-DC converter, if the supply used to recharge the bootstrap capacitor is derived from the same input voltage, a switch (SW) node (e.g., a node connecting high-side and a diode of the power converter) close or below 0 V may help to ensure that the bootstrap capacitor is provided an effective recharge voltage. For example, if the supply voltage ($V_{CC}$) is derived from an input voltage ($V_{IN}$), the SW node may be configured to be close or below 0 V every time operating conditions force $V_{CC}$ smaller than $V_{OUT}+V_{bts\_min}$, where $V_{OUT}$ is an output voltage of the power converter and $V_{bts\_min}$ is a voltage at the bootstrap capacitor. As such, the SW node may be below or close to 0 V every time a free-wheeling diode of the power converter is forward biased. Kirchhoff's law at the SW node is $i_{diode}=i_{coil}-i_{bts}$, where $i_{diode}$ is current at the free-wheeling diode of the power converter, $i_{diode}$ is a current at an inductor of the power converter, and $i_{bts}$ is a current at the bootstrap capacitor of the power converter. In other words, current at the free-wheeling diode ($i_{diode}$) is positive and the free-wheeling diode is forward biased only if current at an inductor ($i_{coil}$) is greater than the current at the bootstrap capacitor ($i_{bts}$). Furthermore, the free-wheeling diode being forward biased has to last enough to restore the charge stored in the bootstrap capacitor lost during an activation of the high-side switch, considering the limited current capability of the full bootstrap recharge path (e.g., $V_{CC}$ possible current limitation and non-zero series resistance of a diode in series with supply voltage ($b_{st\_diode}$) and interconnections).

Similar to a non-synchronous DC-DC converter, the synchronous DC-DC converter may also discharge a bootstrap capacitor when the duty cycle is close to 100%. Differently from the non-synchronous DC-DC converter, the synchronous DC-DC converter may force the SW node close to 0 V just turning on low-side (LS) switch. Turning on the low-side switch can grant bootstrap recharge at the cost of a possible negative coil current. For example, in low load conditions forcing the low-side switch on can make the current in the inductor change sign, which may lead to one or more of a reduced efficiency because the output capacitor is discharged through low-side switch, additional circuitry is needed to protect the low-side switch from negative over-current, or at the turn off of the low-side switch, inductor current can flow through the high-side back-side diode into the input supply (e.g., not allowed in case of reverse current protection on $V_{in}$ path).

Based at least on the foregoing, the conditions for charging the bootstrap capacitor may not be met when, for example, the duty-cycle of the high-side switch is close to 100% or when load current for the power converter is low (e.g., less than a minimum current threshold. If duty-cycle is close to 100%, the SW node may remain below 0 V (e.g., diode forward biased) for a too short time. In this example, the bootstrap capacitor is recharged a bit but the charge lost during an activation of the high-side switch (e.g., HS activation) is not fully restored during off time. Accordingly, the bootstrap capacitor may be completely discharged after a set of switching cycles.

Some systems may impose a minimum off time to prevent the duty-cycle of the high-side switch being close to 100%. However, such systems may not address instances where the power converter operates at medium-low load currents or in instances where the SW node includes a relatively large parasitic capacitance towards ground, which may reduce an amount of time that the bootstrap capacitor is recharged during a switching cycle of the power converter. Moreover, if load current is low, the condition to have the free-wheeling diode forward biased (e.g., such that the SW node is below 0 V) is again met for a too short time and the bootstrap capacitor may be discharged cycle by switching cycles of the power converter.

In accordance with the techniques of the disclosure, during off time, the SW node voltage may depend directly on the currents flowing in the SW node itself (e.g., if LS switch is not used or not present). In case of an undervoltage of the floating supply, by bypassing an output voltage control loop and controlling only the inductor current ($i_{coil}$), the control circuit may force a voltage at the SW node near 0 V for a controlled amount of time, which may help to ensure that the bootstrap capacitor is recharged enough to let the power converter properly operate for several cycles. In this way, the techniques described herein for controlling only the inductor current may extend the input voltage range and minimum load current range, where the power converter can operate with acceptable increased ripple of the output voltage during minimum $i_{peak}$ operation, which may help to improve the performance of the power converter.

Figure 1:
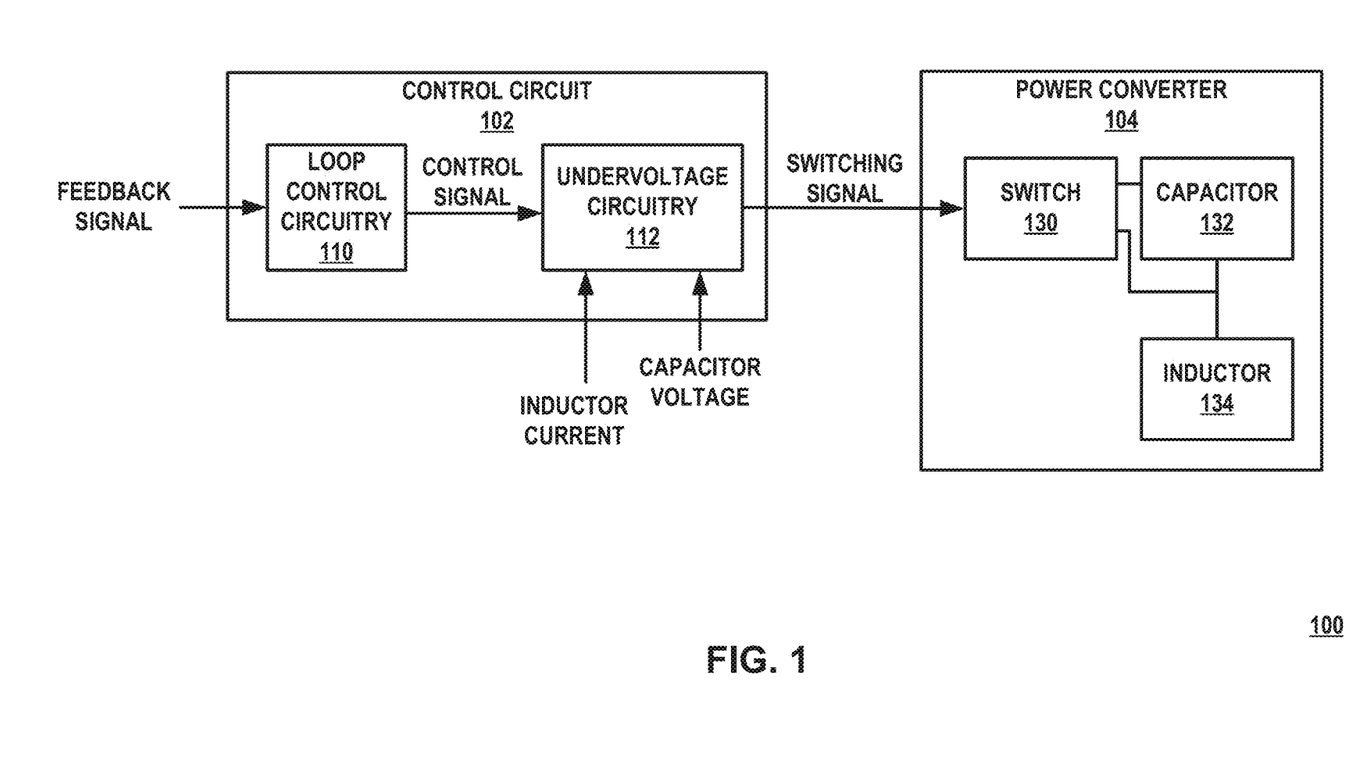
FIG. 1 is a block diagram illustrating an example system for controlling a power converter, in accordance with one or more techniques of this disclosure.

FIG. 1 is a block diagram illustrating an example system for controlling a power converter, in accordance with one or more techniques of this disclosure. As illustrated in the example of FIG. 1, system 100 may include a control circuit 102 and a power converter 104. Control circuit 102 may include loop control circuitry 110 and undervoltage circuitry 112.

Power converter 104 may be configured to generate an output (e.g., an output voltage, an output current, or an output power) based on an operation of a switch 130 of power converter 104. Power converter 104 may include switch-mode power converters. Examples of switch-mode power converters may include, but are not limited to, flyback, buck-boost, buck, Ćuk, or another switch-mode power converter. In some examples, power converter 104 may receive a voltage and output a voltage that is different from the received voltage. For instance, power converter 104 may receive a first voltage and output a second voltage that is less or greater than the first voltage. More specifically, in some examples, power converter 104 may include a Buck converter that bucks (e.g., reduces) the first voltage received from a voltage source. While the example of FIG. 1 is directed to power converters, techniques described herein for recharging a bootstrap capacitor may be directed to, for example, a motor driver (e.g., inductor 134 may include motor or other load), a high-side boot strap supply, a floating supply domain, or a boot strapped capacitor.

Switch 130 may comprise a switching element. Examples of switching elements may include, but are not limited to, a silicon-controlled rectifier (SCR), a Field Effect Transistor (FET), and a bipolar junction transistor (BJT). Examples of FETs may include, but are not limited to, a junction field-effect transistor (JFET), a metal-oxide-semiconductor FET (MOSFET), a dual-gate MOSFET, an insulated-gate bipolar transistor (IGBT), any other type of FET, or any combination of the same. Examples of MOSFETS may include, but are not limited to, a depletion mode p-channel MOSFET (PMOS), an enhancement mode PMOS, depletion mode n-channel MOSFET (NMOS), an enhancement mode NMOS, a double-diffused MOSFET (DMOS), any other type of MOSFET, or any combination of the same.

Examples of BJTs may include, but are not limited to, PNP, NPN, heterojunction, or any other type of BJT, or any combination of the same. It should be understood that switching elements may be high-side or low-side switching elements. Additionally, switching elements may be voltage-controlled and/or current-controlled. Examples of current-controlled switching elements may include, but are not limited to, gallium nitride (GaN) MOSFETs, BJTs, or other current-controlled elements.

Control circuit 102 may be configured to control switch 130 of power converter 104. As shown, control circuit 102 may directly control switch 130 using the switching signal. However, in some examples, a driver may be configured to drive switch 130 of power converter 104 based on the switching signal.

In accordance with the techniques of the disclosure, loop control circuitry 110 may be configured to generate a control signal based on a feedback signal for power converter 104. For example, loop control circuitry 110 may be configured to generate the control signal to increase a duty cycle for operating switch 130 when the feedback indicates a voltage is less than a reference voltage and to decrease the duty cycle for operating switch 130 when the feedback indicates a voltage is greater than the reference voltage. While the above example refers to the feedback signal indicating only a voltage, the feedback signal may indicate other electrical characteristics of power converter 104, such as, for example, one or more of a current output by power converter 104, a power output by power converter 104, a voltage output by power converter 104, or another voltage, current, or power at power converter 104.

Undervoltage circuitry 112 may be configured to compare a voltage for a capacitor 132 of power converter 104 with a voltage threshold. A bootstrap capacitor may be positioned in parallel with switch 130 (e.g., a high-side switch). In response to the voltage for capacitor 132 of power converter 104 being greater than the voltage threshold, undervoltage circuitry 112 may generate a switching signal to drive a switch 130 of power converter 104 based on the control signal. For example, undervoltage circuitry 112 may pass through the control signal as the switching signal.

In response, however, to the voltage for capacitor 132 of power converter 104 being less than the voltage threshold, undervoltage circuitry 112 may generate the switching signal to drive switch 130 to the switched-in state until an inductor current for an inductor 134 of power converter 104 is greater than an electrical current threshold. For example, undervoltage circuitry 112 may generate the switching signal to force switch 130 to the switched-in state until the inductor current for inductor 134 is greater than the electrical current threshold even if the control signal indicates to switch-out switch 130. In this way, the techniques described herein for controlling only the inductor current may extend the input voltage range and minimum load current range where power converter 104 can operate, which may help to improve the performance of power converter 104.

Figure 2:
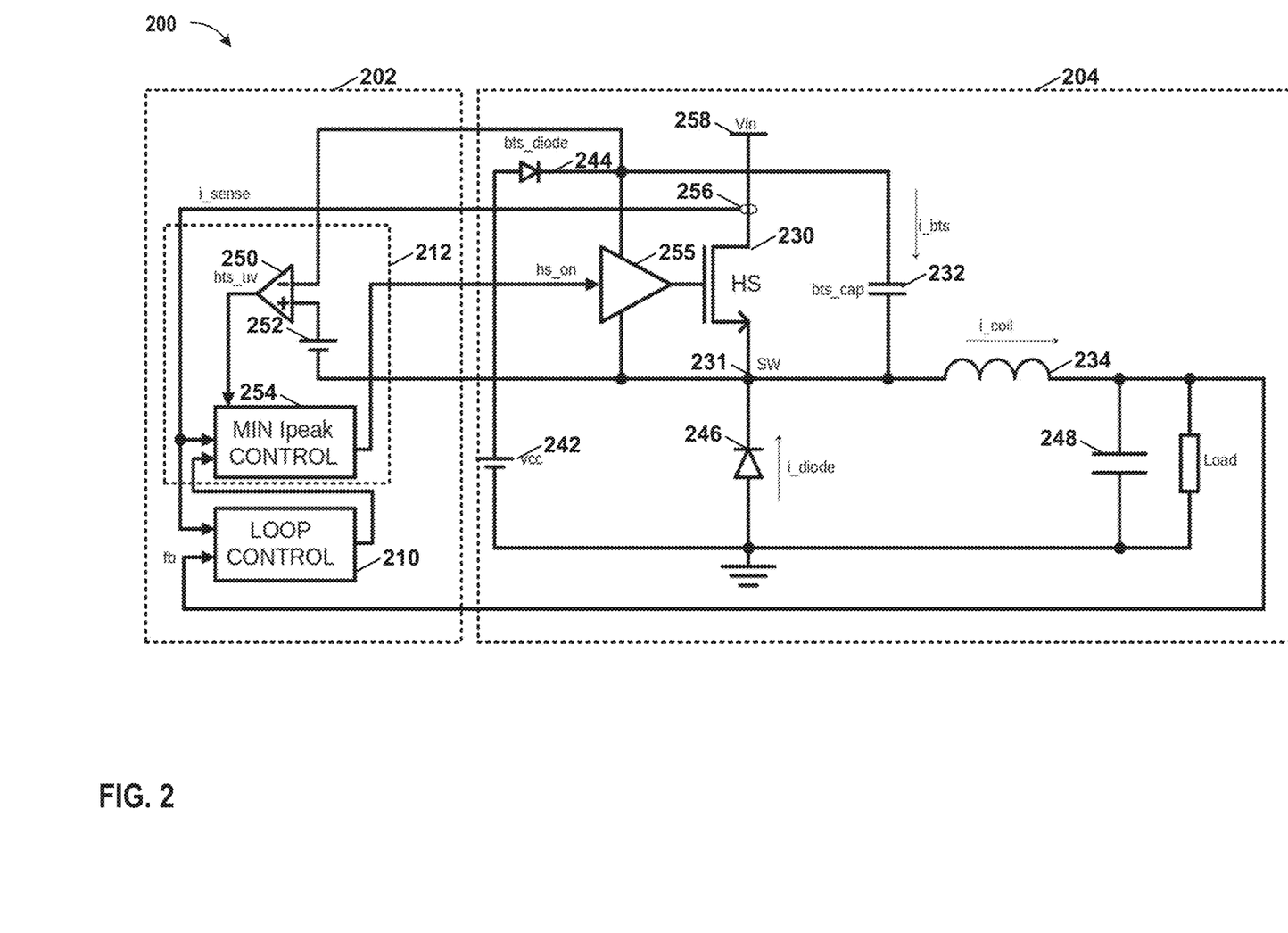
FIG. 2 is a conceptual diagram illustrating an example non-synchronous Buck converter and an example circuit for controlling the non-synchronous Buck converter, in accordance with one or more techniques of this disclosure.

FIG. 2 is a conceptual diagram illustrating an example non-synchronous Buck converter 204 and an example circuit for controlling non-synchronous Buck converter 204, in accordance with one or more techniques of this disclosure. FIG. 2 is discussed with reference to FIG. 1 for example purposes only. As illustrated in the example of FIG. 2, system 200 may include a control circuit 202 and a non-synchronous Buck converter 204. Control circuit 202 may include loop control circuitry 210 (also referred to herein as simply "loop control 210") and undervoltage circuitry 212.

While synchronous Buck converters differ from non-synchronous Buck converters in that negative inductor current cannot occur in non-synchronous Buck converters and may be undesirable in synchronous Buck converters, bootstrap capacitor recharging is similar for both synchronous and non-synchronous Buck converters. Specifically, both synchronous Buck converters and non-synchronous Buck converters, benefit from having a positive current in the low-side switch or diode for the time needed to recharge the bootstrap capacitor. Accordingly, this disclosure is directed to non-synchronous Buck converter 204 but similar considerations apply for synchronous Buck converters, as well as other power converters and/or applications. In the example of FIG. 2, high-side switch 230 (also referred to herein as simply "switch 230") is a high-side switch of non-synchronous Buck converter 204. As shown, non-synchronous Buck converter 204 includes a diode 246. As shown, switch node 231 electrically connects switch 230, a cathode of a diode 246, a bootstrap capacitor 232 (also referred to herein as simply "capacitor 232"), and an inductor 234. While FIG. 2 is directed to a non-synchronous Buck converter, techniques described herein for bootstrap capacitor recharging may be applied to other circuits, such as, for example, a synchronous Buck converter. In a synchronous Buck converter, diode 246 may be replaced by a low-side switch.

Some systems may keep high-side switch 230 switched-in (e.g., activated) for a fixed amount of time whenever the bootstrap voltage at bootstrap capacitor 232 reaches an undervoltage threshold. Keeping high-side switch 230 switched-in will rise inductor current at inductor 234 and when high-side switch 230 is switched-out (e.g., deactivated), SW node 231 may be forced near 0 V by diode 246 being forward polarized. As shown in FIG. 2, switch node 231 electrically connects high-side switch 230, diode 246, capacitor 232, and inductor 234. In a synchronous Buck converter, the switch node electrically connects a high-side switch, a low-side switch, a capacitor, and the inductor. However, if the input voltage is really close to output voltage of non-synchronous Buck converter 204, the inductor current rises relatively slowly. As such, if the time where high-side switch 230 switched-in is fixed, the inductor current may not reach a high enough value to properly recharge bootstrap capacitor 232.

Some systems may use a charge pump that helps $V_{CC}$ 242 recharge bootstrap capacitor 248 without relying on a voltage level at SW node 231. Often, charge pump circuits are sized to allow 100% duty operation, but their current capability is usually not enough to sustain high-side switching activity. Also, charge pumps may use a lot of area of an integrated circuit, external capacitors, and high frequency clocks that may disturb loop control 210.

For non-synchronous Buck converter 204, the resistance (R) may be defined as a sum of the resistances in the bootstrap capacitor recharging path. For example, the resistance (R) may be defined as a sum of a $V_{CC}$ 242 output resistance, bootstrap diode ($bts_{diode}$) 244 resistance, and wiring resistance). The maximum current ($i_{bts\_max}$) recharging the bootstrap capacitor ($bts_{cap}$) 232 can be set by the resistance (R) or by current limiters implemented in $V_{CC}$ 242. The minimum time ($t_{recharge}$) may refer to a minimum time bootstrap capacitor 232 to be recharged.

Kirchhoff's law at SW node 231 can be defined as $i_{diode} = i_{coil} - i_{bts}$, where $i_{diode}$ is current at diode 246, $i_{coil}$ is a current at inductor 234, and $i_{bts}$ is a current at capacitor 232. Current ($i_{diode}$) at diode 246 is positive and diode 246 is forward biased only if coil current is greater than bootstrap recharging current. However, this condition is not always met or can't be met for the necessary time needed to recharge capacitor 246 using only loop control 210.

In accordance with the techniques of the disclosure, whenever the bootstrap voltage at capacitor 232 satisfies an undervoltage threshold, undervoltage circuitry 212 may turn on high-side (HS) switch 230 and keep high-side switch 230 on until inductor current ($i_{coil}$) at inductor 234 reaches a defined value ($i_{peak}$), not considering the reset command from loop control 210. After the turn off of high-side switch 230, SW node 231 stays near or below 0 V for a time that is directly proportional to $i_{peak}$. Therefore, the parameter $i_{peak}$ (also referred to herein as "an electrical current threshold") can be properly chosen to guarantee bootstrap capacitor 232 has enough time to be recharged. For buck converters, relevant equations are as follows:

$$\text{slope(coil current falling slope)} = V_{out}/L_{coil} \quad \text{EQUATION 1}$$

where $V_{out}$ is an output at output capacitor 248, $L_{coil}$ is an inductance of inductor 234, and slope is a slope of the inductor current ($i_{coil}$) at inductor 234.

$$t_{sw \leq 0}(\text{time } SW \text{ is near or below } 0V) = \frac{i_{peak} - i_{bts\_max}}{\text{slope}} \quad \text{EQUATION 2}$$

where $t_{sw<0}$ is time that a voltage at SW node 231 is near or below 0 V, $i_{peak}$ is a parameter chosen to guarantee bootstrap capacitor 232 has enough time to be recharged, $i_{bts\_max}$ is the maximum current recharging the bootstrap capacitor (bts-cap) 232 set by the resistance (R) or by current limiters implemented in $V_{CC}$ 242, and the slope is defined by Equation 1.

$$t_{recharge} < t_{sw \leq 0} \rightarrow i_{peak} > i_{bts\_max} + \text{slope}^* t_{recharge} \quad \text{EQUATION 3}$$

where $t_{recharge}$ is a recharge time for capacitor 232.

For example, undervoltage circuitry 212 may be configured with an electrical current threshold (e.g., an $i_{peak}$ parameter) chosen to guarantee bootstrap capacitor 232 has enough time to be recharged. In this example, undervoltage circuitry 212 may generate a switching signal to force switch 230 to the switched-in state until the inductor current for inductor 234 is greater than an electrical current threshold even if a control signal output from loop control 210 indicates to switch-out switch 230. In this way, the techniques described herein for controlling only the inductor current may extend the input voltage range and minimum load current range where non-synchronous Buck converter 204 can operate, which may help to improve the performance of non-synchronous Buck converter 204.

Configuring undervoltage circuitry 212 to generate the switching signal to force switch 230 to the switched-in state until the inductor current for inductor 234 is greater than an electrical current threshold may improve a performance of non-synchronous Buck converter 204. For example, if a minimum off time is imposed to non-synchronous Buck converter 204 and load current is in the medium to low range, switching falling time reduces the amount of time bootstrap capacitor 232 is recharged, which decreases a bootstrap voltage at bootstrap capacitor 232. When the bootstrap voltage crosses the undervoltage threshold, undervoltage circuitry 212 activates the $i_{peak}$ mechanism. For example, undervoltage circuitry 212 may generate the switching signal to force switch 230 to the switched-in state until the inductor current for inductor 234 is greater than an electrical current threshold. If $i_{peak}$ is properly sized, inductor current at inductor 234 will rise enough to reduce the falling time of a voltage at SW node 231, so that the voltage at SW node 231 remains close to 0 V for at least the minimum recharge time, giving enough time to fully recharge bootstrap capacitor 232.

If load current output by non-synchronous Buck converter 204 is low and the inductor current ($i_{coil}$) at inductor 234 is above a bootstrap recharging current for a too short time to fully recharge bootstrap capacitor 232 the bootstrap voltage decreases. When the bootstrap capacitor voltage crosses the undervoltage threshold, undervoltage circuitry 212 activates the $i_{peak}$ mechanism. For example, undervoltage circuitry 212 may generate the switching signal to force switch 230 to the switched-in state until the inductor current for inductor 234 is greater than an electrical current threshold. If $i_{peak}$ is properly sized, inductor current at inductor 234 will rise enough to reduce the falling time of a voltage at SW node 231, so that the voltage at SW node 231 remains close to 0 V for at least the minimum recharge time, giving enough time to fully recharge bootstrap capacitor 232.

In case of a synchronous topology, a low-side switch (e.g., a switch replacing diode 246) does not need to be activated for a long time to recharge bootstrap capacitor 232. Instead, the high-side switch (e.g., switch 230) will stay on for a longer time and inductor current at inductor 234 will rise, granting bootstrap recharge as previously described. Techniques described herein for activating the $i_{peak}$ mechanism may help to ensure that the inductor current will never go negative and the area needed for negative overcurrent monitoring circuitry can be saved. Techniques described herein may help to force a voltage at SW node 231 close or below 0 V, such that the bootstrap cap recharge is ensured even at low supply conditions (e.g., low output current), when the supply voltage output by $V_{CC}$ 242 is smaller than $V_{OUT} + V_{bts\_min}$, where $V_{OUT}$ is an output voltage of the power converter and $V_{bts\_min}$ is a minimum needed differential voltage (bts-SW) at bootstrap capacitor 232 to operate circuitry connected in parallel to bootstrap capacitor 232 (for example driver 255, if present).

For example, loop control 210 may be configured to generate a control signal based on a feedback signal for non-synchronous Buck converter 204. Loop control 210 may be configured to generate the control signal to increase a duty cycle for operating switch 230 when the feedback (fb) indicates a voltage is less than an output voltage threshold and to decrease the duty cycle for operating switch 230 when the feedback indicates a voltage is greater than the output voltage threshold. For example, loop control 210 may detect a voltage at the output of non-synchronous Buck converter 204. While the above example refers to the feedback signal indicating only a voltage, the feedback signal may indicate other electrical characteristics of non-synchronous Buck converter 204, such as, for example, one or more of a current output by non-synchronous Buck converter 204, a power output by non-synchronous Buck converter 204, a voltage output by non-synchronous Buck converter 204, or another voltage, current, or power at non-synchronous Buck converter 204.

Undervoltage circuitry 212 may be configured to compare a voltage for a capacitor 232 with a voltage threshold. For example, comparator 250 may be configured to output an undervoltage signal when the voltage for capacitor 232 is less than a voltage threshold. The voltage threshold may be set to a minimum needed differential voltage (bts-SW) at bootstrap capacitor 232 to operate circuitry connected in parallel to bootstrap capacitor 232 (for example driver 255, if present) As shown, a negative input (−) of comparator 250 may be electrically connected to a first terminal of capacitor 232 and a positive input (+) of comparator 250 may be electrically connected, via a voltage supply 252 configured to output the voltage threshold, to a second terminal of capacitor 232. As shown, the voltage threshold may be generated by voltage supply 252. Voltage supply 252 may include, for example, a circuit configured to provide a reference voltage powered from voltage provided by capacitor 232. In this example, a minimum $I_{peak}$ control 254 may be configured to generate the switching signal based on the undervoltage signal, which is described in further detail below. Minimum $I_{peak}$ control 254 may output a switching signal (hs_on) to a driver 255. However, in some examples, driver 255 may be omitted.

In response to the voltage for capacitor 232 being greater than the voltage threshold, minimum $I_{peak}$ control 254 may generate a switching signal to drive a switch 230 based on the control signal. For example, minimum $I_{peak}$ control 254 may pass through the control signal output by loop control 210 as the switching signal. In this way, minimum $I_{peak}$ control 254 may be configured to generate the switching signal to drive switch 203 to switch-in when the control signal output by loop control 210 indicates to switch-in the switch and to drive switch 230 to switch-out when the control signal output by loop control 210 indicates to switch-out switch 230.

In response, however, to the voltage for capacitor 232 being less than the voltage threshold, minimum $I_{peak}$ control 254 may generate the switching signal to drive switch 230 to the switched-in state until an inductor current for an inductor 234 is greater than an electrical current threshold. The electrical current threshold may be properly sized such that inductor current at inductor 234 will rise enough to reduce the falling time of a voltage at SW node 231, so that the voltage at SW node 231 remains close to 0 V for at least the minimum recharge time, giving enough time to fully recharge bootstrap capacitor 232. For example, minimum $I_{peak}$ control 254 may be configured to, in response to the undervoltage signal output by comparator 250, generate the switching signal to force switch 230 to the switched-in state until the inductor current for inductor 234 is greater than the electrical current threshold even if the control signal output by loop control 210 indicates to switch-out switch 230.

As shown, a current sensor 256 may be configured to sense the inductor current used by minimum $I_{peak}$ control 254. For example, current sensor 256 may be arranged to detect current at a node electrically connecting a first terminal of switch 230 and a supply ($V_{IN}$) 258. In some examples, current sensor 256 may be arranged in series with inductor 234. Current sensor 256 may be arranged on a second terminal of switch 230 (e.g., SW node 231). In this way, the techniques described herein for controlling only the inductor current may extend the input voltage range and minimum load current range where non-synchronous Buck converter 204 can operate, which may help to improve the performance of non-synchronous Buck converter 204.

Figure 3:
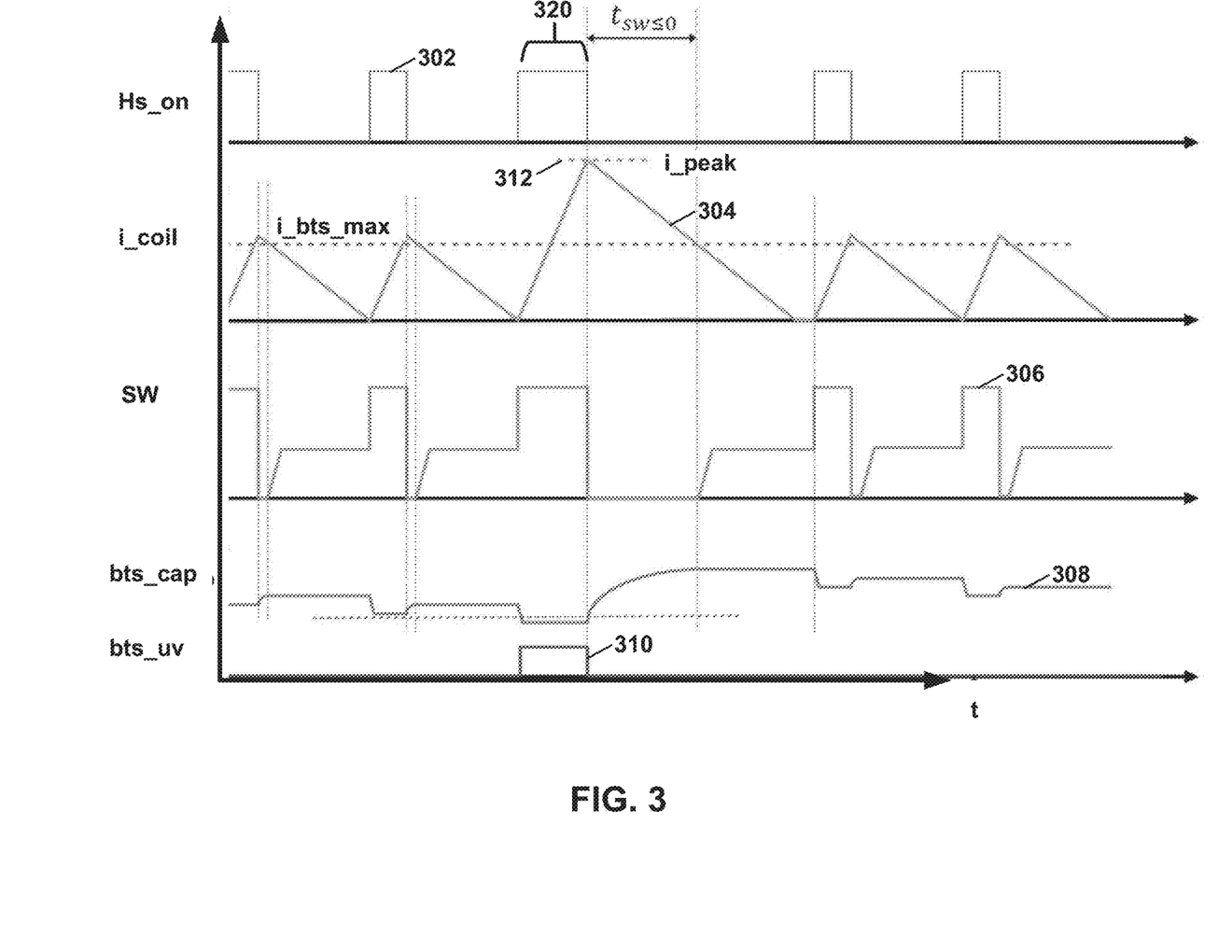
FIG. 3 is conceptual graph illustrating an example cycle of a switching signal, in accordance with one or more techniques of this disclosure.

FIG. 3 is conceptual graph illustrating an example cycle of a switching signal, in accordance with one or more techniques of this disclosure. FIG. 3 is discussed with reference to FIGS. 1-2 for example purposes only. The abscissa axis of FIG. 3 represents time and the ordinate axis of FIG. 3 represents a switching state 302 of switch 232, inductor current 304 of inductor 234, a switch node voltage 306 at switch node 231, a bootstrap voltage 308 at bootstrap capacitor 232, and an undervoltage signal 310 output by comparator 250.

In the example of FIG. 3, in response to the undervoltage signal 310 indicating that the voltage for capacitor 232 is less than a voltage threshold (e.g., during time range 320), minimum $I_{peak}$ control 254 may generate the switching signal to drive switch 230 to the switched-in state until inductor current 304 satisfies (e.g., is equal to or greater than) an electrical current threshold ($i_{peak}$) 312. For example, minimum $I_{peak}$ control 254 may be configured to, in response to the undervoltage signal output by comparator 250, generate the switching signal to force switch 230 to the switched-in state until inductor current 304 is greater than electrical current threshold 312 even if the control signal output by loop control 210 indicates to switch-out switch 230. As shown, by properly sizing electrical current threshold 312, inductor current 304 may rise enough to reduce the falling time of switching node voltage 306, so that switching node voltage 306 remains close to 0 V for at least the minimum recharge time. During the time that switching node voltage 306 remains close to 0 V, bootstrap voltage 308 changes to a fully recharged level.

Figure 4:
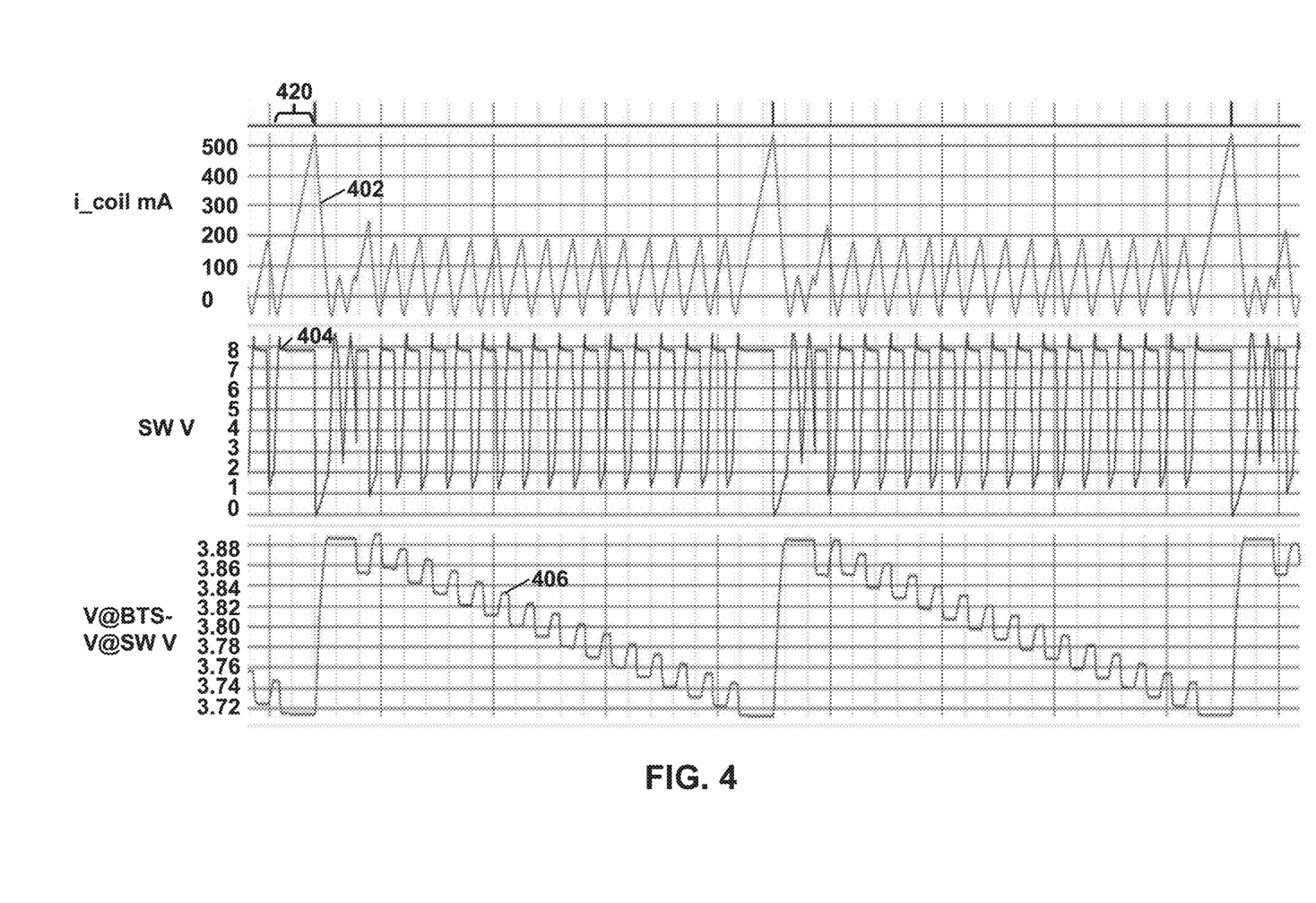
FIG. 4 is a conceptual graph illustrating an example operation of a power converter controlled in accordance with one or more techniques of this disclosure.

FIG. 4 is a conceptual graph illustrating an example operation of a power converter controlled in accordance with one or more techniques of this disclosure. FIG. 4 is discussed with reference to FIGS. 1-3 for example purposes only. The abscissa axis of FIG. 4 represents time and the ordinate axis of FIG. 4 represents an inductor current 402 of inductor 234, a switch node voltage 404 at switch node 231, and a bootstrap voltage 406 at bootstrap capacitor 232.

During time range 420, minimum $I_{peak}$ control 254 may generate the switching signal to drive switch 230 to the switched-in state until inductor current 402 satisfies (e.g., is equal to or greater than) an electrical current threshold. As shown, by properly sizing the electrical current threshold, inductor current 402 may rise enough to reduce the falling time of switching node voltage 404, so that switching node voltage 404 remains close to 0 V such that bootstrap voltage 406 changes to a fully recharged level.

Figure 5:
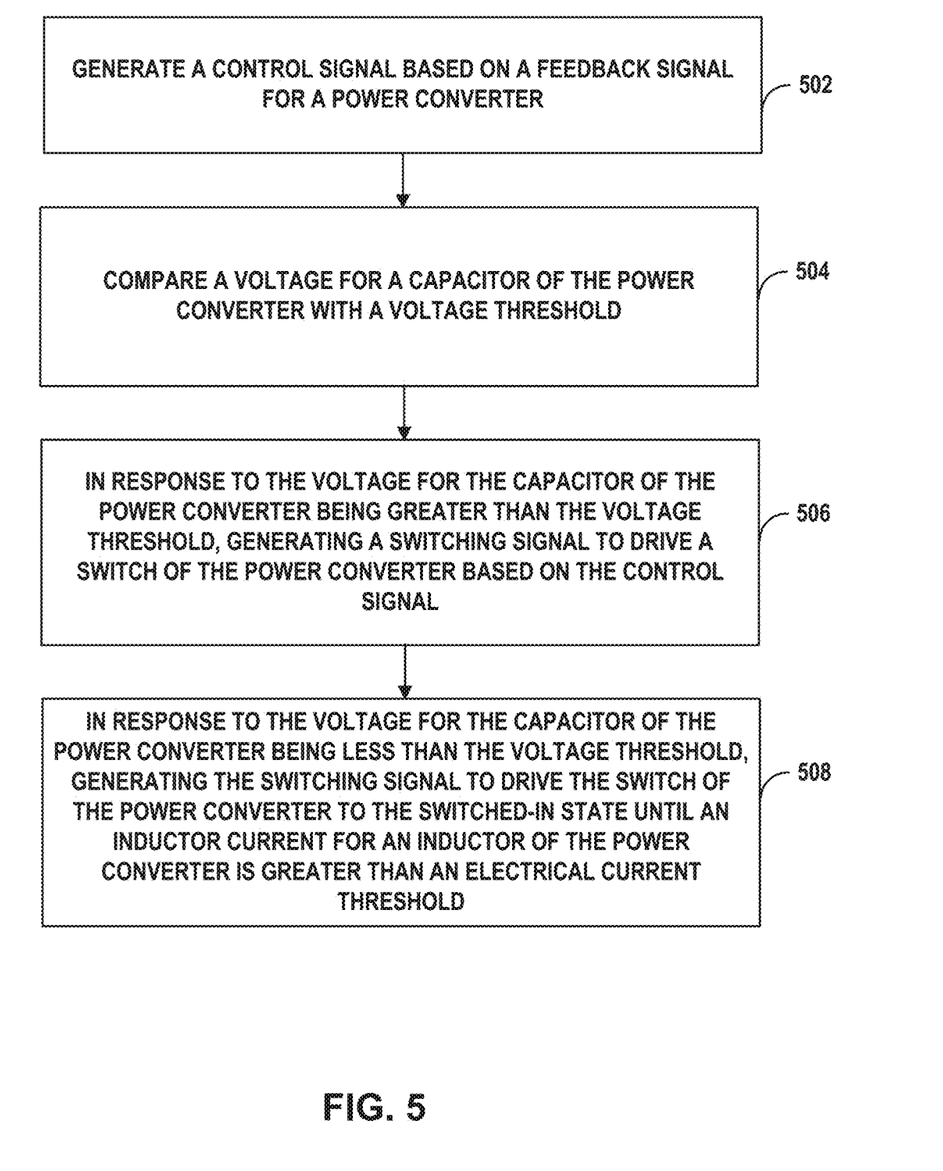
FIG. 5 is a flow diagram consistent with techniques that may be performed by the example system of FIG. 1, in accordance with this disclosure.

FIG. 5 is a flow diagram consistent with techniques that may be performed by the example system of FIG. 1, in accordance with this disclosure. FIG. 5 is discussed with reference to FIGS. 1-4 for example purposes only. While the example of FIG. 5 is directed to power converters, techniques described herein for recharging a bootstrap capacitor may be directed to, for example, a motor driver (e.g., inductor 134 may include motor or other load), a high-side boot strap supply, a floating supply domain, or a boot strapped capacitor.

In the example of FIG. 5, control circuit 102 may generate a control signal based on a feedback signal for power converter 104 (502). Control circuit 102 may compare a voltage for a capacitor 132 of power converter 104 with a voltage threshold (504). For example, comparator 250 of FIG. 2 may output an undervoltage signal when the voltage for capacitor 232 is less than a voltage threshold set by voltage supply 252. In response to the voltage for capacitor 132 of power converter 104 being greater than the voltage threshold, control circuit 102 may generate a switching signal to drive a switch 130 of power converter 104 based on the control signal (506). For example, minimum $I_{peak}$ control 254 of FIG. 2 may pass through the control signal output by loop control 210 as the switching signal.

In response to the voltage for capacitor 132 of power converter 104 being less than the voltage threshold, control circuit 102 may generate the switching signal to drive switch 130 of power converter 104 to the switched-in state until an inductor current for an inductor 134 of power converter 104 is greater than an electrical current threshold (508). For example, minimum $I_{peak}$ control 254 of FIG. 2 may be configured to, in response to the undervoltage signal output by comparator 250, generate the switching signal to force switch 230 to the switched-in state until inductor current 304 is greater than electrical current threshold 312 even if the control signal output by loop control 210 indicates to switch-out switch 230. By properly sizing the electrical current threshold, the inductor current may rise enough, such that the switching node voltage remains close to 0 V for at least the minimum recharge time. During the time that the switching node voltage remains close to 0 V, capacitor 132 may fully charge. In this way, undervoltage circuitry 112 may help to ensure that capacitor 132 may fully charge while allowing power converter 104 to operate with little or no restrictions on a duty cycle (e.g., 100% duty cycle may be permitted). Moreover, techniques described herein for charging the bootstrap capacitor may allow little or no restriction to an input voltage range and/or a load current range for power converter 104, which may help to improve the performance of power converter 104 and/or reduce a complexity for loop control circuitry 110 to control power converter 104.

The following clauses may illustrate one or more aspects of the disclosure.

Clause 1: A circuit for controlling a switch of a power converter includes loop control circuitry configured to generate a control signal based on a feedback signal for the power converter; and undervoltage circuitry configured to: compare a voltage for a capacitor of the power converter with a voltage threshold; in response to the voltage for the capacitor of the power converter being greater than the voltage threshold, generate a switching signal to drive a switch of the power converter based on the control signal; and in response to the voltage for the capacitor of the power converter being less than the voltage threshold, generate the switching signal to drive the switch of the power converter to the switched-in state until an inductor current for an inductor of the power converter is greater than an electrical current threshold.

Clause 2: The circuit of clause 1, wherein the undervoltage circuitry comprises a comparator configured to output an undervoltage signal when the voltage for the capacitor of the power converter is less than the voltage threshold; and wherein the undervoltage circuitry is configured to generate the switching signal based on the undervoltage signal.

Clause 3: The circuit of clause 2, wherein the undervoltage circuitry is configured to, in response to the undervoltage signal, generate the switching signal to force the switch of the power converter to the switched-in state until the inductor current for the inductor of the power converter is greater than the electrical current threshold even if the control signal indicates to switch-out the switch.

Clause 4: The circuit of any of clauses 2 and 3, wherein a negative input of the comparator is electrically connected to a first terminal of the capacitor; and wherein a positive input of the comparator is electrically connected, via a voltage supply configured to output the voltage threshold, to a second terminal of the capacitor.

Clause 5: The circuit of any of clauses 1 through 4, wherein, to generate the switching signal to drive the switch of the power converter based on the control signal, the undervoltage circuitry is configured to generate the switching signal to drive the switch to switch-in when the control signal indicates to switch-in the switch and to drive the switch to switch-out when the control signal indicates to switch-out the switch.

Clause 6: The circuit of any of clauses 1 through 5, further comprising a current sensor configured to generate the inductor current for the inductor.

Clause 7: The circuit of any of clauses 1 through 6, wherein the switch comprises a high-side switch of the power converter.

Clause 8: The circuit of clause 7, wherein the power converter comprises a non-synchronous buck converter.

Clause 9: The circuit of any of clauses 7 and 8, wherein the power converter further comprises a low-side switch.

Clause 10: The circuit of clause 9, wherein a switch node of the power converter electrically connects the high-side switch, the low-side switch, the capacitor, and the inductor.

Clause 11: The circuit of clause 7, wherein the power converter comprises a synchronous buck converter.

Clause 12: The circuit of clause 11, wherein the power converter further comprises a diode, wherein a switch node of the power converter electrically connects the high-side switch, a cathode of the diode, the capacitor, and the inductor.

Clause 13: The circuit of any of clauses 11 through 12, wherein the feedback signal comprises one or more of an output voltage of the power converter or a current output by the power converter.

Clause 14: A method for controlling a switch of a power converter includes generating a control signal based on a feedback signal for the power converter; comparing a voltage for a capacitor of the power converter with a voltage threshold; in response to the voltage for the capacitor of the power converter being greater than the voltage threshold, generating a switching signal to drive a switch of the power converter based on the control signal; and in response to the voltage for the capacitor of the power converter being less than the voltage threshold, generating the switching signal to drive the switch of the power converter to the switched-in state until an inductor current for an inductor of the power converter is greater than an electrical current threshold.

Clause 15: The method of clause 14, wherein generating the switching signal to drive the switch of the power converter based on the control signal comprises generating the switching signal to drive the switch to switch-in when the control signal indicates to switch-in the switch and to drive the switch to switch-out when the control signal indicates to switch-out the switch.

Clause 16: The method of any of clauses 14 and 15, wherein the switch comprises a high-side switch of the power converter.

Clause 17: The method of clause 16, wherein the power converter comprises a non-synchronous buck converter.

Clause 18: The circuit method clause 16, wherein the power converter further comprises a low-side switch.

Clause 19: The method of clause 18, wherein the power converter comprises a synchronous buck converter.

Clause 20: A system includes a power converter; and a control circuit includes loop control circuitry configured to generate a control signal based on a feedback signal for the power converter; and undervoltage circuitry configured to: compare a voltage for a capacitor of the power converter with a voltage threshold; when the voltage for the capacitor of the power converter is greater than the voltage threshold, generate a switching signal to drive a switch of the power converter based on the control signal; and when the voltage for the capacitor of the power converter is less than the voltage threshold, generate the switching signal to drive the switch of the power converter to the switched-in state until an inductor current for an inductor of the power converter is greater than an electrical current threshold.

Clause 21: A circuit for controlling a switch of a motor driver includes loop control circuitry configured to generate a control signal based on a feedback signal for the motor driver converter; and undervoltage circuitry configured to: compare a voltage for a capacitor of the motor driver with a voltage threshold; in response to the voltage for the capacitor of the motor driver being greater than the voltage threshold, generate a switching signal to drive a switch of the motor driver based on the control signal; and in response to the voltage for the capacitor of the motor driver being less than the voltage threshold, generate the switching signal to drive the switch of the motor driver to the switched-in state until an inductor current for an inductor of the motor driver is greater than an electrical current threshold.

Various aspects have been described in this disclosure. These and other aspects are within the scope of the following claims.

What is claimed is:

1. A circuit for controlling a switch of a power converter, the circuit comprising:
   loop control circuitry configured to generate a control signal based on a feedback signal for the power converter; and
   undervoltage circuitry configured to:
      compare a voltage for a bootstrap capacitor of the power converter with a voltage threshold;
      in response to the voltage for the bootstrap capacitor of the power converter being greater than the voltage threshold, generate a switching signal to drive a switch of the power converter based on the control signal; and
      in response to the voltage for the bootstrap capacitor of the power converter being less than the voltage threshold, generate the switching signal to drive the switch of the power converter to the switched-in state until an inductor current for an inductor of the power converter is greater than an electrical current threshold.

2. The circuit of claim 1,
   wherein the undervoltage circuitry comprises a comparator configured to output an undervoltage signal when the voltage for the bootstrap capacitor of the power converter is less than the voltage threshold; and
   wherein the undervoltage circuitry is configured to generate the switching signal based on the undervoltage signal.

3. The circuit of claim 2, wherein the undervoltage circuitry is configured to, in response to the undervoltage signal, generate the switching signal to force the switch of the power converter to the switched-in state until the inductor current for the inductor of the power converter is greater than the electrical current threshold even if the control signal indicates to switch-out the switch.

4. The circuit of claim 2,
   wherein a negative input of the comparator is electrically connected to a first terminal of the bootstrap capacitor; and
   wherein a positive input of the comparator is electrically connected, via a voltage supply configured to output the voltage threshold, to a second terminal of the bootstrap capacitor.

5. The circuit of claim 1, wherein, to generate the switching signal to drive the switch of the power converter based on the control signal, the undervoltage circuitry is configured to generate the switching signal to drive the switch to switch-in when the control signal indicates to switch-in the switch and to drive the switch to switch-out when the control signal indicates to switch-out the switch.

6. The circuit of claim 1, further comprising a current sensor configured to sense the inductor current for the inductor.

7. The circuit of claim 1, wherein the switch comprises a high-side switch of the power converter.

8. The circuit of claim 7, wherein the power converter comprises a non-synchronous buck converter.

9. The circuit of claim 7, wherein the power converter further comprises a low-side switch.

10. The circuit of claim 9, wherein a switch node of the power converter electrically connects the high-side switch, the low-side switch, the bootstrap capacitor, and the inductor.

11. The circuit of claim 7, wherein the power converter comprises a synchronous buck converter.

12. The circuit of claim 7, wherein the power converter further comprises a diode, wherein a switch node of the power converter electrically connects the high-side switch, a cathode of the diode, the bootstrap capacitor, and the inductor.

13. The circuit of claim 1, wherein the feedback signal comprises one or more of an output voltage of the power converter or a current output by the power converter.

14. A method for controlling a switch of a power converter, the method comprising:
   generating a control signal based on a feedback signal for the power converter;
   comparing a voltage for a bootstrap capacitor of the power converter with a voltage threshold;
   in response to the voltage for the bootstrap capacitor of the power converter being greater than the voltage threshold, generating a switching signal to drive a switch of the power converter based on the control signal; and
   in response to the voltage for the bootstrap capacitor of the power converter being less than the voltage threshold, generating the switching signal to drive the switch of the power converter to the switched-in state until an inductor current for an inductor of the power converter is greater than an electrical current threshold.

15. The method of claim 14, wherein generating the switching signal to drive the switch of the power converter based on the control signal comprises generating the switching signal to drive the switch to switch-in when the control signal indicates to switch-in the switch and to drive the switch to switch-out when the control signal indicates to switch-out the switch.

16. The method of claim 14, wherein the switch comprises a high-side switch of the power converter.

17. The method of claim 16, wherein the power converter comprises a non-synchronous buck converter.

18. The method of claim 16, wherein the power converter further comprises a low-side switch.

19. A system comprising:
   a power converter; and
   a control circuit comprising:
      loop control circuitry configured to generate a control signal based on a feedback signal for the power converter; and
      undervoltage circuitry configured to:
         compare a voltage for a bootstrap capacitor of the power converter with a voltage threshold;
         when the voltage for the bootstrap capacitor of the power converter is greater than the voltage threshold, generate a switching signal to drive a switch of the power converter based on the control signal; and when the voltage for the bootstrap capacitor of the power converter is less than the voltage threshold, generate the switching signal to drive the switch of the power converter to the switched-in state until an inductor current for an inductor of the power converter is greater than an electrical current threshold.

20. The circuit of claim 1, wherein the bootstrap capacitor is positioned in parallel with the switch.

\* \* \* \* \*